US006469073B1

(12) United States Patent
Manke et al.

(10) Patent No.: US 6,469,073 B1
(45) Date of Patent: Oct. 22, 2002

(54) SYSTEM AND METHOD OF DELAMINATING A LAYERED SILICATE MATERIAL BY SUPERCRITICAL FLUID TREATMENT

(75) Inventors: Charles W. Manke, West Bloomfield, MI (US); Esin Gulari, Detroit, MI (US); Deborah Frances Mielewski, Ann Arbor, MI (US); Ellen Cheng-chi Lee, Ann Arbor, MI (US)

(73) Assignees: Ford Global Technologies, Inc., Dearborn, MI (US); Wayne State University, Detroit, MI (US)

( * ) Notice: Subject to any disclaimer, the term of this patent is extended or adjusted under 35 U.S.C. 154(b) by 0 days.

(21) Appl. No.: 09/748,670

(22) Filed: Dec. 22, 2000

(51) Int. Cl.$^7$ .............................. C08J 3/20; C08K 9/00; B28D 1/32; C04B 14/04
(52) U.S. Cl. ...................... 523/216; 524/445; 528/483; 125/23.01; 252/378 R
(58) Field of Search ......................... 523/216; 524/445; 528/483; 125/23.01; 252/378 R

(56) References Cited

U.S. PATENT DOCUMENTS

| | | | |
|---|---|---|---|
| 4,451,633 A | | 5/1984 | Brownscombe et al. |
| 4,748,220 A | | 5/1988 | Hartmann et al. |
| 4,845,056 A | | 7/1989 | Yamanis |
| 5,264,404 A | | 11/1993 | Takahama et al. |
| 5,312,882 A | | 5/1994 | DeSimone et al. |
| 5,382,623 A | | 1/1995 | DeSimone et al. |
| 5,385,776 A | | 1/1995 | Maxfield et al. |
| 5,506,317 A | | 4/1996 | DeSimone et al. |
| 5,589,105 A | | 12/1996 | DeSimone et al. |
| 5,616,286 A | | 4/1997 | Jordan |
| 5,639,836 A | | 6/1997 | DeSimone et al. |
| 5,679,737 A | | 10/1997 | DeSimone et al. |
| 5,698,624 A | * | 12/1997 | Beall et al. |
| 5,814,678 A | | 9/1998 | Randolph |
| 5,840,796 A | * | 11/1998 | Badesha et al. |
| 5,846,643 A | * | 12/1998 | Badesha et al. |
| 5,910,523 A | | 6/1999 | Hudson |
| 6,136,908 A | * | 10/2000 | Liao et al. |
| 6,228,903 B1 | * | 5/2001 | Beall et al. |

FOREIGN PATENT DOCUMENTS

EP       0 512 401 A2    11/1992

OTHER PUBLICATIONS

Dekoninck Eric, The Supercritical Fluids—Reflection Conceived Within the Framework of the Research Department.
Arimitsu Usuki et al, Synthesis of Nylon 6–Clay Hybrid, J. Mater, Res., vol. 8, No. 5, May 1993 © 1993 Materials Research Society, pp. 1179–1183.
NANOCOR—Nanoclays, Copyright © 1999, Nanocor.
James D. Destefani, Small But Mighty, Molding Systems— Oct. 1999, pp. 32, 34–36.
Bernie Miller, 'Nana' clay particles create new components, May/Jun. 1997 Plastics Formulating & Compounding, pp. 30–32.
Trexel, Inc., Trexel Unveils Commercialization of MuCell `Omicrocellular Foam Process, © 1998 Trexel, Jun. 18, 1998, pp. 1–2.
Trexel, Inc., Injection Molding, Newsletters: vol. II—Fed. 2000, pp. 1–4.
Trexel, Inc., MuCell Technology Takes Off—Reprinted from European Plastics News—Jul./Aug. 2000, pp. 1–2.
Trexel, Inc., Microcellular Moulding, Reprinted from European Plastic News—Sep. 1998, pp. 1–3.
Bernie Miller, Tiny Clay Particles Pack Potent Properties Punch, Mechanical properties provided by set them apart from conventional mineral fillers—and there are other surprising differences too., Plastics World / Oct. 1997, pp. 36–38.
Yoshitsugu Kojima, Mechanical Properties of nylon 6–clay hybrid, J. Mater, Res., vol. 8, No. 5, May 1993 © 1993 Materials Research Society, pp. 1185–1189.
Arimitsu Usuki, Charasteristics and Properties of Nylon 6—Clay Hybrid, Toyota Central Res. & Develop. Labs., Inc., pp. 651–652.

* cited by examiner

*Primary Examiner*—Tae H. Yoon
(74) *Attorney, Agent, or Firm*—Damian Porcari

(57) ABSTRACT

The present invention involves a system and method of delaminating a layered silicate to provide improved mechanical properties to select materials such as polymers. The method includes providing particles of the layered silicate and a supercritical fluid. The method further includes contacting the layered silicate particles with the supercritical fluid to define contacted layered silicate particles and catastrophically depressurizing the contacted layered silicate particles to exfoliate the layered particles so that the layered particles are substantially dispersed, defining treated silicate particles.

15 Claims, 3 Drawing Sheets

SYSTEM AND METHOD OF DELAMINATING A LAYERED SILICATE MATERIAL BY SUPERCRITICAL FLUID TREATMENT

BACKGROUND OF THE INVENTION

1. Field of the Invention

The present invention relates to a method of delaminating a layered silicate to produce particulates for uses including producing a reinforced polymer having improved mechanical properties and to reinforce polymer containing these particulates.

2. Background Art

Plastics usage in the automotive industry is steadily increasing due to their light weight and continual improvements in mechanical properties. Currently, polymer-based materials may comprise at least 15 percent of a given vehicle's weight. These materials are used in various automotive components, e.g., interior and exterior trim and side panels. As pressures to improve fuel economy continue, more steel and aluminum parts may be targeted for replacement by polymer-based materials. Thus, improvements in the mechanical properties of polymers are necessary in order to meet more stringent performance requirements. Mechanical properties of a polymer include stiffness, dimensional stability, modulus, heat deflection temperature, barrier properties, and rust and dent resistance, to name a few. Improved mechanical properties may reduce manufacturing costs by reducing the part thickness and weight of the manufactured part and the manufacturing time thereof.

There are a number of ways to improve the mechanical properties of a polymer, including reinforcement with particulate fillers or glass fibers. Currently, it is known that polymers reinforced with nanometer-sized platelets or particles of layered silicates or clay can impact significant improvements in mechanical properties at much lower loading than conventional fillers. This type of composite is termed a "nanocomposite". More specifically, polymer-silicate nanocomposites are compositions in which nano-sized particles of a layered silicate, e.g., montmorillonite clay, are dispersed into a thermoplastic or a thermoset matrix. The improvement in mechanical properties of nanocomposites is due to a combination of factors, such as high aspect ratio and surface area of the particles.

Typically, two steps are involved in producing reinforced polymers or polymer nanocomposites. The first step involves a process of conditioning or preparing the clay to make it more compatible with a selected polymer. The conditioning step is performed because the clay is generally hydrophilic and many polymer resins of interest are hydrophobic, thus rendering the two relatively incompatible.

In its natural state, clay is made up of stacks of individual particles held together by ionic forces. A cation exchange may be performed to exchange a naturally occurring inorganic cation with an organic cation. In addition, this process may increase the interlayer spacing between each particle, lessening the attractive forces between them. This allows the clay to be compatible with the polymer for subsequent polymerization or compounding. This preparatory step is known as "cation exchange". Generally, cation exchange is performed with a batch reactor containing an aqueous solution wherein an organic molecule, usually an alkyl ammonium salt, is dissolved into water along with the clay particles. The reactor is then heated. Once ion exchange takes place, the clay particles precipitate out and are then dried.

Depending on the polymer, a monomer may be further intercalated into the clay galleries. The organically modified clay is then ready for melt compounding to combine the clay with the polymer to make a workable material, or polymerizing monomers in the presence of the modified clay. Both the polymerization step and the melt compounding step involve known processing conditions in which the particles disperse and exfoliate in the polymer.

However, while this strategy is effective in more polar systems such as nylon, efforts to extend the technology to extremely non-polar polymers, such as polyolefins, have met with limited success. Many attempts at generating polyolefin based nanocomposites have been partially successful only by use of large amounts of compatibilizers. Not only is this prohibitively expensive, but the enhanced dispersion and exfoliation gained with the use of compatibilizers comes at the expense of matrix stiffness, since the compatibilizers are themselves of low molecular weight.

Additionally, because of the high melt viscosity of many thermoplastics, uniform dispersion of the layered silicate becomes difficult. On the other hand, in systems such as nylons and epoxies which can be polymerized in situ, intercalation of monomers and exfoliation of silicate layers is less of an issue. In situ polymerization of polyolefins, however, is plagued by sensitive and unstable catalysts.

Therefore, the use of supercritical fluids to both pretreat/delaminate silicate layers and to reduce melt viscosity is an attractive means of generating a well-exfoliated polymer silicate nanocomposite material for any material system.

SUMMARY OF THE INVENTION

It is an object of the present invention to provide an improved method of delaminating a layered silicate for applications such as producing reinforced polymers having improved mechanical properties.

It is also an object of the present invention to provide a cost effective and time saving method of delaminating a layered silicate. for producing reinforced polymers having improved mechanical properties.

The present invention provides a method of delaminating a layered silicate, wherein the method includes providing particles of the layered silicate, contacting the layered silicate particles with a supercritical fluid to produce contacted layered silicate particles, and catastrophically depressurizing the contacted layered silicate particles to exfoliate the layered particles so that the layered particles are substantially dispersed, producing treated layered silicate particles.

The present invention also provides an improved method of preparing a reinforced polymer. The method includes providing particles of a layered silicate, contacting the layered silicate particles with a supercritical fluid, and catastrophically depressurizing the contacted layered silicate particles to exfoliate the layered silicate particles so that the layered particles are substantially dispersed, defining treated layered silicate particles, and mixing the treated layered silicate particles with a polymer to form the reinforced polymer.

The present invention also provides a delaminated layered silicate which comprises exfoliated silicate particles substantially apart from each other, without the use of intercalation agents. Each of the particles preferably has a length of between about 50 and 2000 nanometers.

The present invention also provides an improved reinforced polymer. The reinforced polymer includes a polymer mixed with a layered silicate having particle layers exfoliated by a supercritical fluid. The silicate layers are substantially exfoliated and dispersed within the polymer to provide added reinforcement thereto.

DETAILED DESCRIPTION OF THE PREFERRED EMBODIMENT(S)

Figure 1:
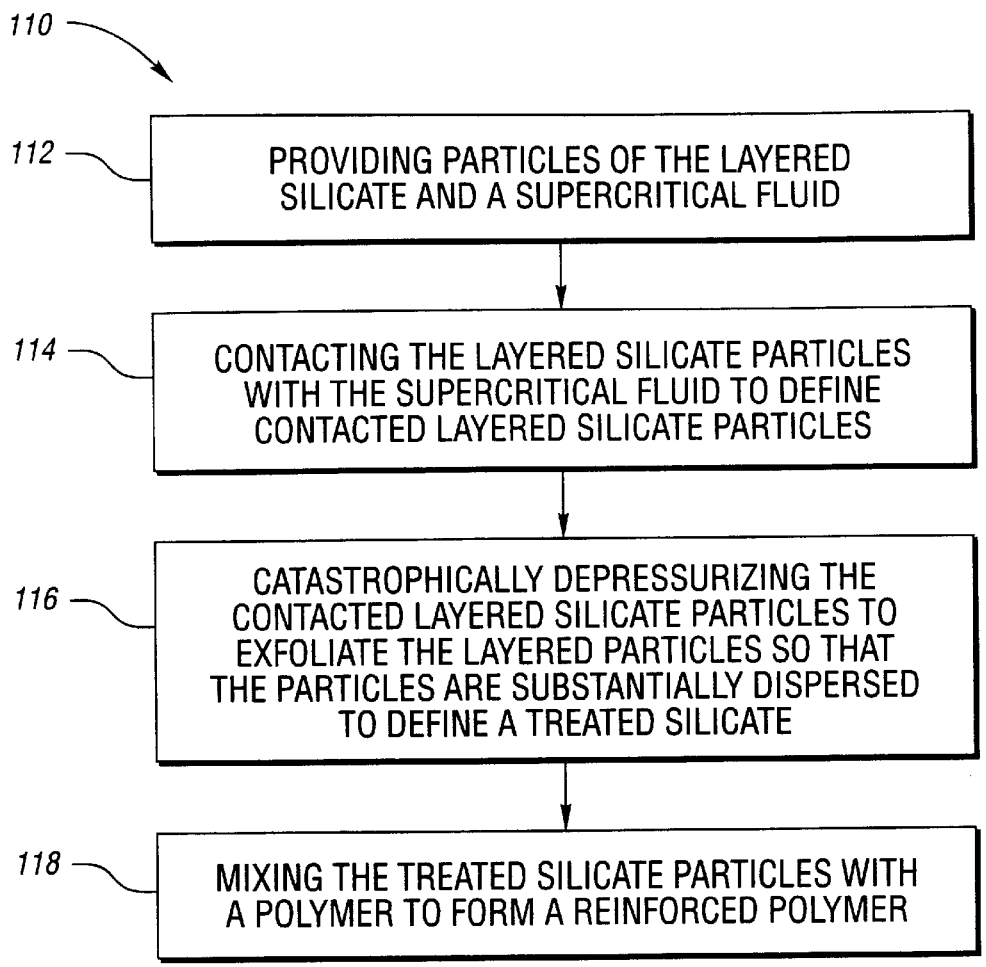
FIG. 1 is a flowchart depicting one method of delaminating a layered silicate to produce a reinforced polymer.

FIG. 1 depicts in 110 one method of delaminating a layered silicate and forming a reinforced polymer in accordance with the present invention. The method includes providing particles or platelets of a layered silicate and providing a supercritical fluid in box 112. In this embodiment, the layered silicate is a layered silicate clay called montmorillonite, a hydrophilic mineral, having a layered platy structure. The silicate has layered individual particles with thicknesses of preferably about one nanometer and diameters of preferably about 50 to more than 2000 nanometers.

In this embodiment, the supercritical fluid is preferably carbon dioxide which can exist as a fluid having properties of both a liquid and a gas when above its critical temperature and critical pressure. As is known, carbon dioxide at its supercritical conditions has both a gaseous property, being able to penetrate through many materials and a liquid property, being able to dissolve materials into their components. As is known, if a substance is heated and is maintained above its critical temperature, it becomes impossible to liquefy it with pressure. When pressure is applied to this system, a single phase forms that exhibits unique physicochemical properties. This single phase is termed a supercritical fluid and is characterized by a critical temperature and critical pressure. Supercritical fluids have offered favorable means to achieve solvating properties which have gas and liquid characteristics without actually changing chemical structure. By proper control of pressure and temperature, a significant range of physicochemical properties (density, diffusivity, dielectric constants, viscosity) can be accessed without passing through a phase boundary, e.g., changing from gas to liquid form.

The method shown in FIG. 1 may be completed with the use of a number of apparatus known in the art, such as a pressurized vessel and a mixer. The vessel may be any conventional pressure vessel configured to receive layered silicate particles and supercritical fluid from any conventional source, and to have the capability of maintaining high pressure and high temperature therein. In a preferred embodiment, the vessel includes at least two isolatable compartments, one of which separately receives layered silicate particles. However, the vessel may have a single compartment which vents to the atmosphere by any suitable means such as a ball valve. The mixer may be any conventional system, e.g., an extruder or injection molding machine, configured to receive treated silicate particles and a polymer into which the treated silicate particles are mixed and by means of which a reinforced polymer is produced. The source of supercritical fluid may be any conventional fluid source such as a gas cylinder containing the fluid of choice.

The layered silicate particles are preferably placed in one of two separable compartments of the vessel. In this embodiment, the vessel includes first and second separable compartments, each of which may be isolated and separably pressurized. The layered silicate particles are placed in the first compartment which is sealed off from the second compartment which is at atmospheric pressure. The compartments may be isolated by any conventional means. Then, as shown in box 114 of FIG. 1, the method includes contacting the layered silicate particles with the supercritical fluid to produce contacted layered silicate particles. This may be accomplished by injecting the supercritical fluid into the first compartment of the vessel containing the layered silicate particles. In this embodiment, contacting the layered silicate particles with the supercritical fluid includes pressurizing the particles with the supercritical fluid to above about 1100 pounds per square inch gauge (psig) and heating the particles and the supercritical fluid to above about 31 degrees Celsius. In this embodiment, these ranges define a supercritical condition of the preferred supercritical fluid, carbon dioxide. However, other ranges may apply for other supercritical fluids and embodiments. Pressurizing and heating the particles with the supercritical fluid may be accomplished by any conventional means. In this embodiment, the vessel containing the particles is pressurized by regulating the supercritical fluid being injected into the vessel from the fluid source and is heated by conventional electrical heating tape disposed about the vessel. Contacting the layered silicate particles with the supercritical fluid further includes maintaining contact for between about 0.5 minute to 10 hours at the supercritical condition, to produce contacted layered silicate particles.

As shown in box 116 of FIG. 1, the method further includes catastrophically depressurizing the contacted layered silicate particles to exfoliate the particles such that the particles are substantially disordered, defining treated silicate particles. The treated silicate is in a powder form. The step of depressurizing includes immediately depressurizing the vessel down to a considerably lower pressure, preferably ambient pressure. In this embodiment, the pressure decrease is accomplished by first opening the first compartment to be in fluid communication with the second compartment. Then, the compartments may be opened to depressurize down to ambient pressure. In this embodiment, as depressurizing occurs, heating is stopped, thus lowering temperature of the particles. As immediate depressurization occurs, the silicate particles are substantially singly dispersed apart from each other (exfoliated).

Although not wanting to be limited to any particular theory, it is believed that the low viscosity and high diffusivity of the supercritical fluid allows the supercritical fluid to become disposed or intercalated between the layers of silicate particles during supercritical conditions, providing an increase in interlayer spacing therebetween, without requiring organic intercalation agents. It is further believed that, upon depressurization, the supercritical fluid disposed interstitially between the particles force the particles to exfoliate or delaminate from each other. Thus, a substantially uniformly dispersed amount of treated silicate particles results.

As shown in box 118 of FIG. 1, the method further includes mixing or incorporating the treated silicate with a polymer to form a reinforced polymer having high surface area contact between the silicate particles and the polymer. In this embodiment, the reinforced polymer includes between about 0.1 and 40 percent by weight of montmorillonite clay. Morever, the montmorillonite clay mixed in the reinforced polymer has a relatively high surface area to weight ratio. It is believed that the high surface area can substantially reinforce the polymer by an increase in interfacial interactions while having little added weight. It has been found that polymers reinforced with the montmorillonite clay exfoliated by the subject method provides substantially increased mechanical properties with lower manufacturing time and cost.

Reinforced polymers such as those described above may be manufactured by disposing the treated silicate particles and the polymer into a mixer. The mixer may be any conventional mixer, extruder, injection molding machine known in the art which has been used to mix finely divided reinforcing particles with polymer to form a reinforced polymer. The polymer may be any suitable polymer, such as a polyolefin. In a preferred embodiment, the polymer is polypropylene.

Figure 2:
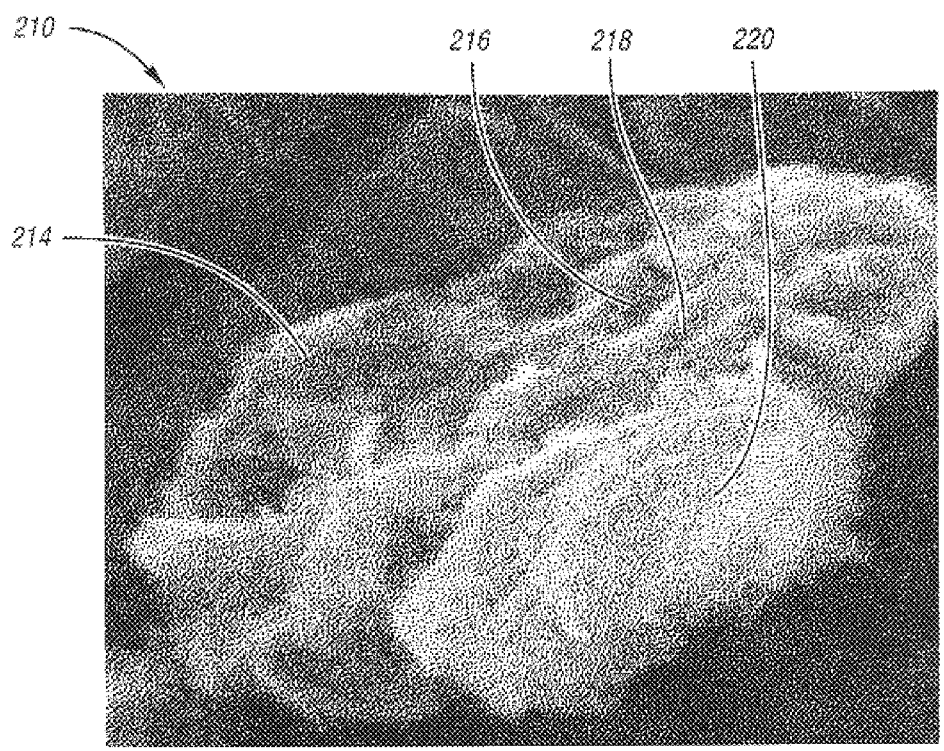
FIG. 2 is a perspective view of a scanning electron microscope (SEM) micrograph of untreated layered silicate particles prior to exfoliation in accordance with the present invention.
Figure 3:
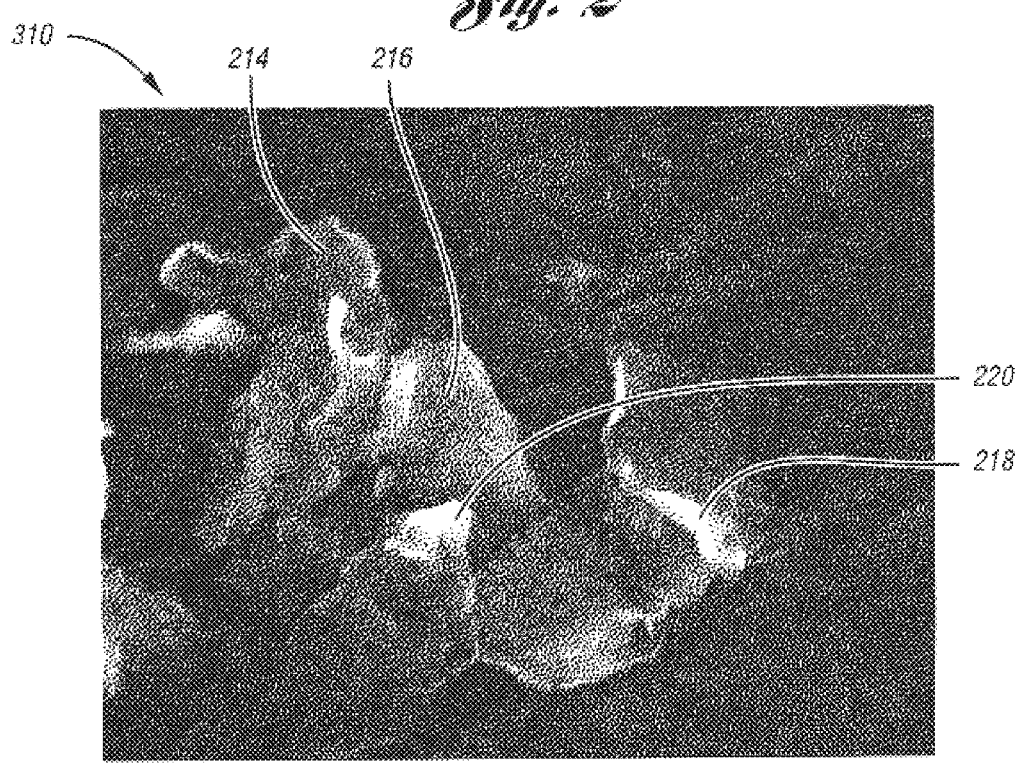
FIG. 3 is a perspective view of a scanning electron microscope (SEM) micrograph of treated silicate particles after exfoliation.

FIG. 2 depicts a SEM micrograph of an untreated layered silicate having layered particles 214, 216, 218, 220. After catastrophic depressurization of the particles in contact with the supercritical fluid at supercritical conditions, FIG. 3 shows the particles being substantially dispersed or disordered, creating greater surface area about particles 214, 216, 218, 220.

Figure 4:
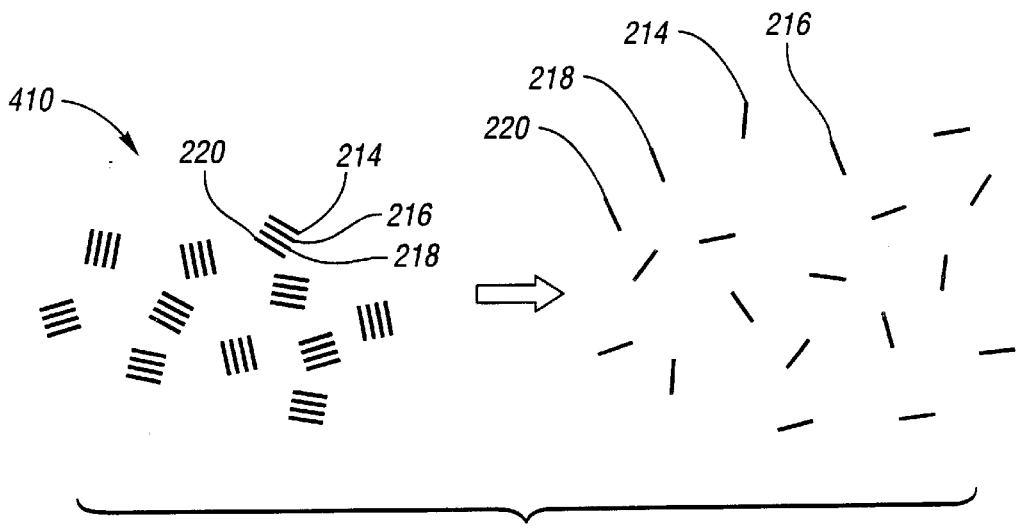
FIG. 4 is a cross-sectional view of conceptual images of the untreated and treated layered silicate particles of FIGS. 2 and 3.

FIG. 4 depicts a conceptual image of layered silicate particles prior to exfoliation and after exfoliation. FIG. 4 shows layered particles 214, 216, 218 with affinity therebetween. After depressurization, FIG. 4 also depicts the particles exfoliated. Exfoliation of the silicate particles provides greater surface area about the particles such that the silicate particles may more uniformly be dispersed within the polymer.

Figure 5:
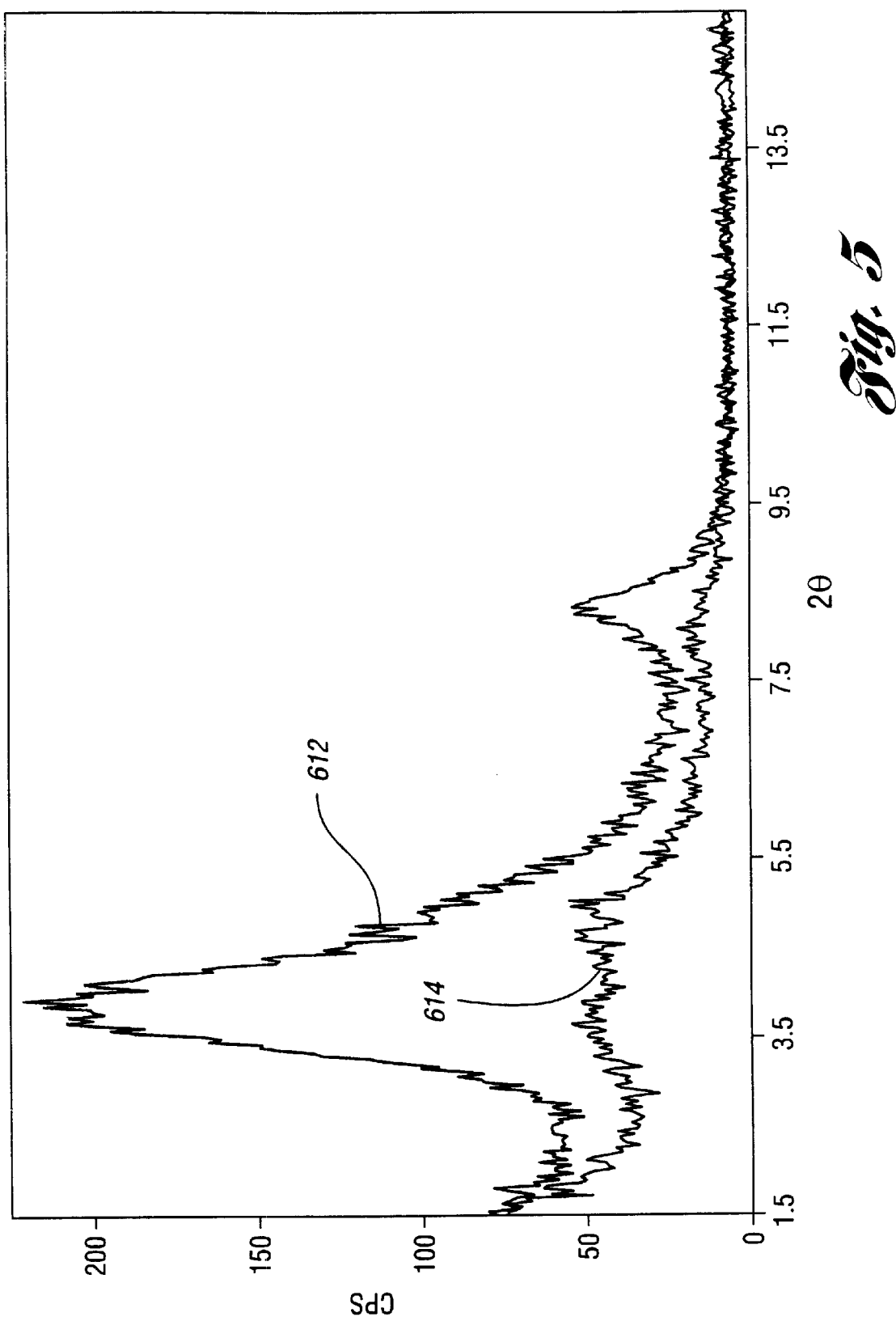
FIG. 5 is a plot of x-ray diffraction spectra of untreated and treated clay particles in accordance with the present invention.

FIG. 5 illustrates a plot of x-ray diffraction spectra 610 of treated and untreated montmorillonite clay samples. As shown, spectrum 612 of the untreated clay provides a well-defined peak indicating a substantially ordered layered structure. On the other hand, spectrum 614 of treated montmorillonite clay particles provides a diffraction pattern which is more diffuse and broadened, indicating a disordered morphology.

In use, the reinforced polymer made in accordance with the present invention may be applied to form interior and exterior parts of a vehicle, e.g., interior trim panels, while requiring less weight than a typical vehicle part made by prior art technology. The reinforced polymer of the present invention allows parts to be relatively lighter in weight than previous parts, while providing the same or better mechanical properties. Additionally, due to the dimensional features of the particles, barrier properties of polymers are also enhanced, providing increased resistance to permeation. This provides the capability of using such reinforced polymers as barrier products, e.g., fuel tanks. Furthermore, also due to the dimensional features of the particles, scratch resistant properties of polymers are enhanced, providing less manifestation of marks or scores placed on a product of the present invention.

Also, the delaminated silicate in accordance with the present invention may be used in other applications, in addition to polymer reinforcement. For example, the delaminated silicate may be used in catalyst supports and anisotropic colloidal particles, to name a few.

EXAMPLES

Example 1 provides a method conducted in delaminating layered silicate particles and preparing a reinforced polymer with the delaminated particles. In this example, the method includes providing montmorillonite as the layered silicate clay, polypropylene resins as the polymer, and carbon dioxide as the supercritical fluid. The example further included loading a first compartment of a dual-compartment stainless steel vessel with 1.5–2.0 grams of montmorillonite clay. The first compartment had a volume of 30 cubic centimeters. A second compartment having a volume of 50 cubic centimeters was isolated from the first compartment and maintained atmospheric pressure therein. The compartments were isolated by an expansion ball valve. The clay was contacted with carbon dioxide at about 1700 psig from a line connected to a high pressure carbon dioxide cylinder. The clay was also heated to about 80 degrees Celsius by heating tape disposed about the vessel. The pressure and temperature were maintained for about 5 hours. Then, the vessel was immediately depressurized by opening the valve such that the first and second compartments were in fluid communication, thus catastrophically lowering the pressure placed on the clay to define treated clay. The treated clay and the polypropylene were then loaded into a mixer in a weight ratio of treated clay to polypropylene of 1:19, and homogeneously dispersed to form a reinforced polymer.

While the best mode for carrying out the invention has been described in detail, those familiar with the art to which this invention relates will recognize various alternative designs and embodiments for practicing the invention as defined by the following claims.

What is claimed:

1. A method of delaminating a layered silicate, the method comprising:
   providing particles of a layered silicate;
   contacting the layered silicate particles with a supercritical fluid to produce contacted layered silicate particles; and
   catastrophically depressurizing the contacted layered silicate particles to exfoliate the layered silicate to substantially exfoliate the layered silicate, forming treated silicate particles.

2. The method of claim 1 wherein the supercritical fluid is carbon dioxide.

3. The method of claim 1 wherein contacting the layered silicate particles includes pressurizing the particles with the supercritical fluid to above the critical pressure of the supercritical fluid.

4. The method of claim 1 wherein contacting the layered silicate particles includes heating the particles with the supercritical fluid to above the critical temperature of the supercritical fluid.

5. The method of claim 1 wherein contacting the layered silicate particles includes maintaining contact for between 0.5 minute and 10 hours.

6. The method of claim 1 wherein the silicate particles are substantially uniformly dispersed upon depressurization.

7. A method of preparing a reinforced polymer, the method comprising:
   providing particles of a layered silicate;
   contacting the layered silicate particles with a supercritical fluid to define contacted layered silicate particles;
   catastrophically depressurizing the contacted layered silicate particles to exfoliate the layered particles so that the particles are substantially dispersed to define a treated silicate; and incorporating the treated silicate particles with a polymer to form a reinforced polymer.

8. The method of claim 7 wherein the supercritical fluid is carbon dioxide.

9. The method of claim 8 wherein contacting the layered silicate particles includes pressurizing the particles with the supercritical fluid to above about 1100 pounds per square inch gauge.

10. The method of claim 8 wherein contacting the layered silicate particles includes heating the particles with the supercritical fluid to above about 30 degrees Celsius.

11. The method of claim 8 wherein contacting the layered silicate particles includes maintaining contact for between 0.5 minute and 10 hours.

12. The method of claim 7 wherein the silicate particles are substantially singly dispersed upon depressurization.

13. The method of claim 7 wherein the reinforced polymer includes between about 0.1 and 40 percent weight of the silicate particles.

14. A delaminated layered silicate comprising:

exfoliated silicate particles substantially singly dispersed apart from each other by a supercritical fluid, wherein each of the particles has a length of between about 50 and 2000 nanometers.

15. The delaminated layered silicate of claim 14 wherein the layered silicate is montmorillonite clay.

\* \* \* \* \*